US012548924B2

(12) United States Patent
Mastel

(10) Patent No.: US 12,548,924 B2
(45) Date of Patent: Feb. 10, 2026

(54) ELECTRICAL CONTACT AND CONDUCTOR TERMINAL FORMED THEREWITH

(71) Applicant: WAGO Verwaltungsgesellschaft mbH, Minden (DE)

(72) Inventor: Rudolf Mastel, Minden (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 281 days.

(21) Appl. No.: 18/274,274

(22) PCT Filed: Jan. 27, 2022

(86) PCT No.: PCT/EP2022/051895
§ 371 (c)(1),
(2) Date: Jul. 26, 2023

(87) PCT Pub. No.: WO2022/162064
PCT Pub. Date: Aug. 4, 2022

(65) Prior Publication Data

US 2024/0313439 A1 Sep. 19, 2024

(30) Foreign Application Priority Data

Feb. 1, 2021 (DE) ..................... 20 2021 100 483.5

(51) Int. Cl.
*H01R 4/48* (2006.01)
*H01R 11/05* (2006.01)

(52) U.S. Cl.
CPC ....... *H01R 4/4842* (2023.08); *H01R 4/48275* (2023.08); *H01R 11/05* (2013.01); *H01R 4/4823* (2023.08)

(58) Field of Classification Search
CPC ... H01R 4/48275; H01R 11/05; H01R 4/4823
USPC ..................................................... 439/439.44
See application file for complete search history.

(56) References Cited

U.S. PATENT DOCUMENTS

| | | | | |
|---|---|---|---|---|
| 8,968,022 B2 * | 3/2015 | Mostoller | ............ | H01R 4/4823 439/438 |
| 2011/0250803 A1 * | 10/2011 | Bies | ....................... | B60N 2/682 439/752.5 |
| 2018/0145428 A1 * | 5/2018 | Meyer | .................. | H01R 4/4821 |
| 2022/0271447 A1 * | 8/2022 | Meier | .................... | H01R 12/57 |
| 2024/0097356 A1 * | 3/2024 | Mastel | ............... | H01R 4/48365 |

FOREIGN PATENT DOCUMENTS

| | | | |
|---|---|---|---|
| DE | 197 35 835 U1 | 2/1999 | |
| DE | 20 2016 101 069 U1 | 4/2016 | |
| DE | 20 2015 104 961 U1 | 1/2017 | |
| EP | 2 770 582 A1 | 8/2014 | |
| WO | WO 2014/160998 A1 | 10/2014 | |

* cited by examiner

*Primary Examiner* — Tulsidas C Patel
(74) *Attorney, Agent, or Firm* — Muncy, Geissler, Olds & Lowe, P.C.

(57) ABSTRACT

The invention relates to an electrical contact for a conductor terminal that has an insulating material housing, wherein the contact has a terminal section for connection to an electrical conductor, wherein the terminal section has a spring force clamping connection with at least one clamping spring for connection of the electrical conductor under spring force. The invention also relates to a conductor terminal having at least one such electrical contact.

19 Claims, 6 Drawing Sheets

ELECTRICAL CONTACT AND CONDUCTOR TERMINAL FORMED THEREWITH

This nonprovisional application is a National Stage of International Application No. PCT/EP2022/051895, which was filed on Jan. 27, 2022, and which claims priority to German Patent Application No.20 2021 100 483.5, which was filed in Germany on Feb. 1, 2021, and which are both herein incorporated by reference.

BACKGROUND OF THE INVENTION

Field of the Invention

The invention relates to an electrical contact for a conductor terminal that has an insulating material housing, wherein the contact has a terminal section for connection to an electrical conductor, wherein the terminal section has a spring force clamping connection with at least one clamping spring for connection of the electrical conductor under spring force. The invention also relates to a conductor terminal having at least one such electrical contact.

Description of the Background Art

Such an electrical contact is known, e.g., from DE 197 35 835 A1.

SUMMARY OF THE INVENTION

The invention is based on the object of providing an improved electrical contact that can be used even more universally. In addition, a corresponding conductor terminal is to be provided.

Said object is achieved with an electrical contact of the aforementioned type by one or both of the following features a), b):

a) The contact has at least three first support points for supporting and holding the electrical conductor clamped to the spring force clamping connection in a first spatial plane.

b) The contact has at least three or at least four second support points for supporting and holding the electrical conductor clamped to the spring force clamping connection in a second spatial plane, which is orthogonal to the first spatial plane.

Each of the above measures secures the electrical conductor to the contact to an improved extent, so that the electrical conductor is already better fixed and secured in a rigid position even when the contact is not yet in the insulating material housing of the conductor terminal. In the case of known conductor terminals, this fixation of the electrical conductor is often effected by parts of the insulating material housing, e.g., by a conductor insertion channel or similar elements. As a result, such conductor terminals or their contacts are not so well suited for being fitted with the electrical conductor before insertion of the contact into the insulating material housing.

The present invention provides an electrical contact that, firstly, has the advantageous properties of a spring force clamping connection for connecting the electrical conductor, namely, easy clamping of the electrical conductor without tools, permanent secure fixation of the electrical conductor and secure contacting, as well as the possibility of releasing the electrical conductor from the spring force clamping connection. In addition, the contact of the invention can be used in a manner comparable to known contacts with crimp technology. In this way, a contact and correspondingly a conductor terminal are created, e.g., for a plug-in connector system, which can be wired and preassembled in a factory wiring similar to the crimping technique, in order to subsequently insert the contacts with the connected electrical conductors into an insulating material housing. However, due to its spring force clamping connection, the contact of the invention is easier and more reliable to wire.

These advantageous properties are made possible in the electrical contact of the invention by the improved support and retention of the electrical conductor on the electrical contact, namely, by the at least three first support points, which are effective in a first spatial plane, and/or the at least four second support points, which are effective in a second spatial plane orthogonal thereto. The first spatial plane can be, e.g., a vertical plane running parallel to the conductor insertion direction, and the second spatial plane can be a horizontal plane running parallel to the conductor insertion direction, in each case with respect to a substantially open-design underside of the electrical contact.

In this regard, the first support points can be arranged in the terminal section. Further, the second support points can be arranged in the terminal section.

According to an advantageous embodiment of the invention, it is provided that the at least three first support points in the conductor insertion direction of the electrical conductor in the spring force clamping connection comprise a front first support point, a middle first support point, and a rear first support point, wherein the middle first support point is arranged behind the front first support point and in front of the rear first support point in the conductor insertion direction and is located on a side of an inserted and connected electrical conductor, which side faces away from the front first support point and rear first support point. This allows a stable three-point mounting of the clamped electrical conductor. The electrical conductor is then held relatively rigidly in the first spatial plane, so that no or at least hardly any twisting movements of the electrical conductor are possible in the first spatial plane relative to the contact. The electrical conductor is thus held on one side by the middle first support point and on the opposite side by the front and rear first support points.

According to an advantageous embodiment of the invention, it is provided that the spring force clamping connection has a defined clamping point for clamping the electrical conductor, wherein the front first support point is in front of the clamping point in the conductor insertion direction and the rear first support point is behind the clamping point. This allows a particularly stable mounting of the electrical conductor and, accordingly, good fixation against movements of the first spatial plane. Depending on the design, the middle first support point can be arranged in front of or behind the clamping point in the conductor insertion direction.

According to an advantageous embodiment of the invention, it is provided that the middle first support point has a distance from the front first support point that deviates by a maximum of 50% from the distance of the middle first support point from the rear first support point. Thus, the middle first support point is arranged approximately centered between the front and rear first support points, wherein the advantageous effects of the aforementioned three-point mounting also come into play in the event of a certain deviation from the exact central arrangement. In a further advantageous embodiment, the middle first support point can have a distance from the front first support point that deviates by a maximum of 25% or a maximum of 10% from the distance of the middle first support point from the rear first support point.

According to an advantageous embodiment of the invention, it is provided that the contact has a run-up slope for the electrical conductor which runs obliquely to the conductor insertion direction, wherein the rear first support point is located at the run-up slope. When the electrical conductor is inserted into the contact, the free end of the electrical conductor thus comes into contact with the run-up slope at a sufficient insertion depth and is held by the run-up slope. In this way, the insertion depth of the electrical conductor is limited at the same time. The oblique arrangement of the run-up slope to the conductor insertion direction creates a great variability in the use of the electrical contact for different conductor cross sections. For example, an electrical conductor with a large cross section comes into contact with the run-up slope at a smaller insertion depth than an electrical conductor with a smaller cross section. Regardless of the cross section, however, the oblique arrangement of the run-up slope ensures that the electrical conductor comes into contact with it at least in every case and thus the rear first support point becomes effective.

According to an advantageous embodiment of the invention, it is provided that the terminal section has a frame-shaped conductor insertion region through which the electrical conductor is to be inserted into the terminal section, wherein the front first support point is located at the frame-shaped conductor insertion region. The contact is designed to be robust due to the frame-shaped conductor insertion region. In addition, a defined conductor insertion opening is provided for the electrical conductor, which opening can be easily identified by the user. In this way, incorrect operation of the electrical contact is avoided. In addition, the frame-shaped conductor insertion region has the additional function of providing the front first support point.

According to an advantageous embodiment of the invention, it is provided that the contact has a resilient tab which projects from the frame-shaped conductor insertion region in the direction of the clamping point and at which the central first support point is located. In this way, the frame-shaped conductor insertion region has another additional function, namely, to provide the middle first support point via the tab connected to the conductor insertion region. Due to its resilient property, the tab has the advantageous effect that the middle first support point can adapt to the conductor cross section of the electrical conductor to be inserted.

According to an advantageous embodiment of the invention, it is provided that the frame-shaped conductor insertion region has two mutually opposite first side walls, a first cover section connecting the first side walls, and a first bottom section opposite to the first cover section, wherein the first side walls, the first bottom section, and the first cover section define a conductor insertion opening. This creates a robust frame structure which can also be manufactured in one piece from a sheet metal part in particular. The resilient tab can protrude, e.g., from the first cover section in the direction of the clamping point.

According to an advantageous embodiment of the invention, it is provided that one or both of the first side walls each have at least one spring tongue which is exposed from the first bottom section and the first cover section and forms a clamping point for clamping an electrical conductor under spring force. In this way, an integrated clamping spring which can also be provided with a one-piece sheet metal part can be provided. If both first side walls have the mentioned spring tongue, the clamping of the electrical conductor can be done symmetrically from both sides. At the free ends of the spring tongues there is then a clamping edge, which is preferably aligned perpendicular to the conductor insertion direction. However, it is also conceivable that the clamping edges are oriented obliquely to the conductor insertion direction, so that the electrical conductor is guided in one direction during insertion, for example, directed towards the run-up slope.

The first bottom section can be formed by a single section of material bent from one first side wall in the direction of the other first side wall.

According to an advantageous embodiment of the invention, it is provided that the first bottom section is formed by two material sections, wherein each of the two material sections is bent from one first side wall in the direction of the other first side wall, wherein a parting line is formed between the two material sections. This has the advantage that the two material sections can be comparatively short, so that they have few resilient properties and can provide a stable first support point in this way.

Regardless of whether the first bottom section is formed by one material section or by two material sections, the respective material section can be bent from the respective first side wall about a bending axis that runs parallel to the conductor insertion direction. In this case, the respective material section runs along the underside of the contact. It is also advantageous to bend the respective material section away from the respective side wall about a bending axis perpendicular to the conductor insertion direction. For example, before bending, the respective material section can protrude from the first side wall in a direction opposite to the conductor insertion direction. After bending, the respective material section then forms a front-side bottom wall on the contact.

According to an advantageous embodiment of the invention, it is provided that the spring force clamping connection has as clamping springs two spring tongues which taper obliquely towards each other and between the free ends of which the clamping point is formed. This allows symmetrical clamping of the electrical conductor between the spring tongues. The spring tongues can have a clamping edge at the free end; this enables a particularly secure clamping of the electrical conductor.

Provided the contact has only one spring tongue, the contact can have only three second support points for supporting and holding the electrical conductor clamped to the spring force clamping connection in the second spatial plane. A second support point is then provided by the one spring tongue. A support for the conductor can then be formed on the inner side of a first side wall of the contact. If two spring tongues are present, they can each provide a second support point.

According to an advantageous embodiment of the invention, it is provided that the at least four second support points comprise two front second support points and two rear second support points in the conductor insertion direction, wherein the front second support points are arranged in front of the rear second support points in the conductor insertion direction. This allows a stable four-point mounting of the clamped electrical conductor. In the second spatial plane, the electrical conductor is then held relatively rigidly, so that no or at least hardly any twisting movements of the electrical conductor are possible in the second spatial plane relative to the contact. The rear second support points can be arranged, e.g., behind the clamping point.

The front and rear second support points each form a pair of cooperating support points which are disposed on mutually opposite sides of the first spatial plane. A respective pair of cooperating support points can be arranged, e.g., mirror-symmetrically with respect to a center plane of the conductor terminal and/or plane-parallel to the first spatial plane. The first spatial plane can be oriented, e.g., parallel to the first and/or second side walls. The first spatial plane can run between the spring tongues. The first spatial plane can form a center plane between the first and/or second side walls. In the case of a clamped electrical conductor, the first and second spatial planes can run in particular through the center axis of the electrical conductor.

According to an advantageous embodiment of the invention, it is provided that the free ends of the spring tongues form the front second support points. This allows a comparatively simple mechanical design of the electrical contact, because no further elements are required to form the front second support points.

According to an advantageous embodiment of the invention, it is provided that the contact has centering bevels which are aligned obliquely with respect to the conductor insertion direction and are arranged in the shape of a funnel, and at which the rear second support points are located. The funnel-shaped design of the centering bevels can be used to reliably secure electrical conductors of different cross sections, similar to what has already been explained for the run-up slope. An electrical conductor with a large cross section cannot be inserted into the funnel-shaped arrangement of the centering bevels as far as electrical conductors with a smaller cross section. In any case, however, it is ensured that the electrical conductor rests against the centering bevels at a sufficient insertion depth, regardless of the cross section, and is centered by these centering bevels and thus held in place by the rear second support points. The centering bevels thus also limit the insertion depth of the electrical conductor, preferably together or in combination with the run-up slope.

The run-up slope can extend obliquely toward the clamping point, e.g., from a second cover section of the contact, which is located behind the first cover section of the contact in the conductor insertion direction. If the second cover section is also arranged behind the centering bevels in the conductor insertion direction, the run-up slope can also be arranged at least partially behind the centering bevels in the conductor insertion direction or extend at least partially into the area of the centering bevels, i.e., overlap with the centering bevels in the conductor insertion direction.

According to an advantageous embodiment of the invention, it is provided that the electrical conductor can be clamped to the spring force clamping connection before the contact is arranged in the insulating material housing, wherein the contact can be inserted into the insulating material housing by means of the clamped-on electrical conductor and can be fixed in the insulating material housing by means of its fixing element. In this way, factory wiring of the electrical contact analogous to the crimping technique is made possible. The individual contacts can be wired and preassembled outside the insulating material housing so as to be inserted subsequently into the insulating material housing. Due to the stable retention of the electrical conductor in the electrical contact, the electrical conductor can thus be used as an aid for inserting the assembly into the insulating material housing.

According to an advantageous embodiment of the invention, it is provided that the contact is formed as a plug-in contact having a plug-in section for pluggable connection to a mating plug-in contact. This has the advantage that the contact can also be used as a plug-in contact in a plug-in connector.

According to an advantageous embodiment of the invention, the electrical contact is integrally formed with some or all of the aforementioned elements from a sheet metal part, e.g., by means of a stamping-bending process. This allows a simple and cost-effective production of the contact.

The mentioned spring tongues can have actuation tongues projecting from spring tongue end edges directed toward the first cover section, wherein the actuation tongues are bent out of the plane of the adjacent spring tongue section, e.g., adjacent to the free end of the spring tongue. The actuation tongues can be bent outwards, i.e., bent away from the clamping point. The actuation tongues form a funnel shape that forms a receiving funnel for an actuation element.

The aforementioned object is further achieved by a conductor terminal with an insulating material housing and one or more electrical contacts of the type explained above, to each of which an electrical conductor is clamped. The previously described advantages can also be realized in this way. If the contact or contacts are designed as plug-in contacts, the conductor terminal can also be designed as a plug-in connector.

According to an advantageous embodiment of the invention, the insulating material housing has an actuation opening which is arranged in the region of the actuation tongues and through which the spring force clamping connection can be opened by means of an actuation tool. Opening the spring force terminal connection moves the spring tongues away from each other, so that a clamped-on electrical conductor can be removed without exerting any force. It is also possible to use the electrical contact in such a way that it is already inserted into the insulating material housing when the electrical conductor is to be clamped on. With a sufficiently rigid electrical conductor, this can be done by simply inserting the electrical conductor in the conductor insertion direction. In addition, it is possible to open the clamping point through the actuation opening by means of the actuation tool, so that the electrical conductor can be guided to the clamping point without exerting any force. In this way, less rigid electrical conductors can also be clamped on without any problems, e.g., stranded conductors.

The aforementioned object is achieved additionally by a method for providing a conductor terminal of the type explained above with at least one electrical conductor connected to an electrical contact of the conductor terminal, having the following steps:

a) Providing the insulating material housing of the conductor terminal, wherein the insulating material housing has one or more contact receiving chambers, each of which is set up to receive an electrical contact, but is not yet equipped with such an electrical contact
b) Connecting an electrical conductor to an electrical contact while the electrical contact is completely outside the contact receiving chamber or loosely inserted therein in a preassembly position
c) Inserting the electrical contact connected to the electrical conductor through a receiving opening into the still free contact receiving chamber of the insulating material housing until the electrical contact has reached an end position within the contact receiving chamber and is fixed there, in particular is locked there.

This allows a particularly advantageous assembly of the individual parts of the conductor terminal. In particular, the electrical conductor can be connected to the electrical contact in a particularly simple and reliable manner while it is still at least partially visible, i.e., while it is not yet completely arranged within the contact receiving chamber of the insulating material housing. Only after the electrical conductor has been correctly attached to the electrical contact is it fully inserted into the contact receiving chamber by means of the electrical conductor and fixed there.

Within the context of the present invention, the indefinite article "a" ("an") is not to be understood as a numeral. If therefore, e.g., a component is being discussed, this should be interpreted in the sense of "at least one component." Insofar as angles are given in degrees, they refer to a circular measure of 360 degrees (360°).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 shows the contact according to FIG. 1 in a side view with the electrical conductor clamped on;

DETAILED DESCRIPTION

Figure 1:
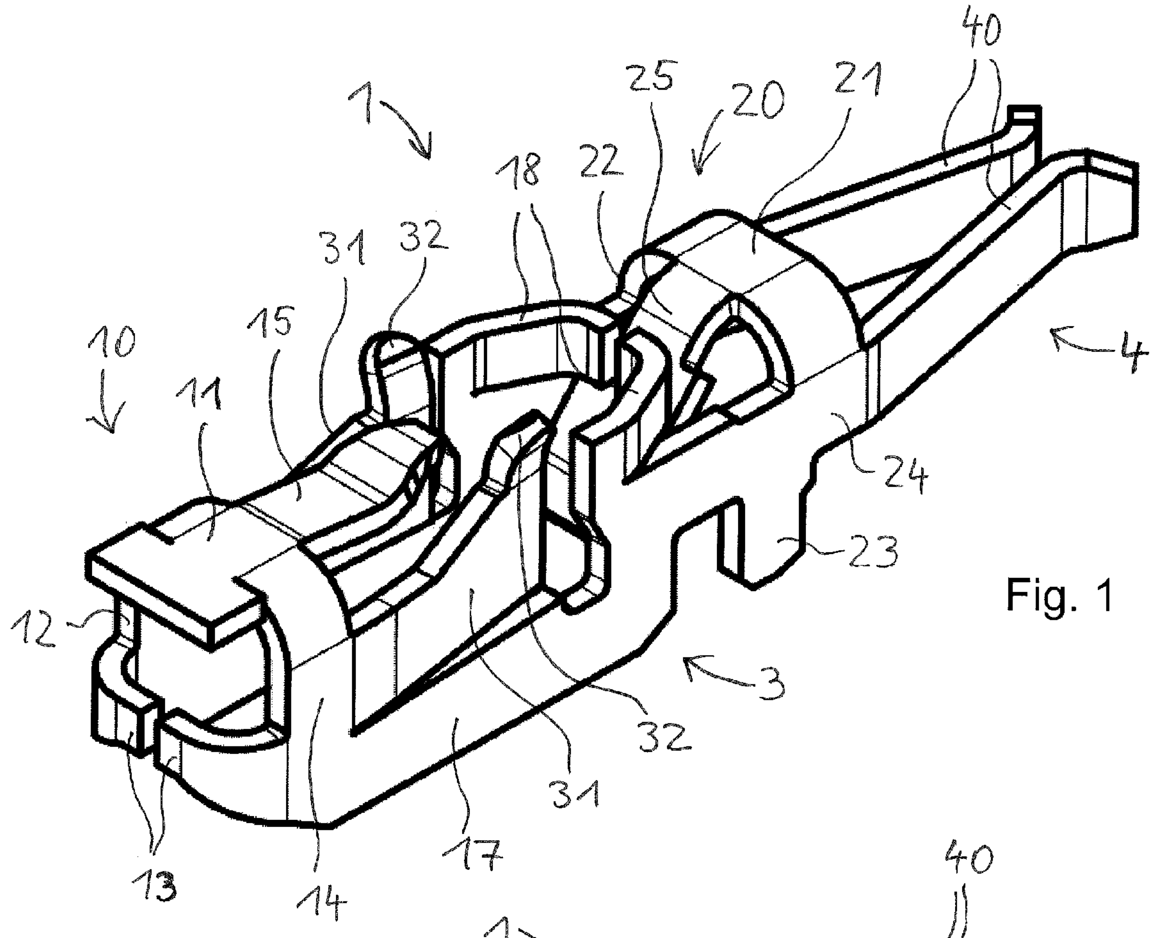
FIG. 1 shows an electrical contact in a perspective view.
Figure 2:
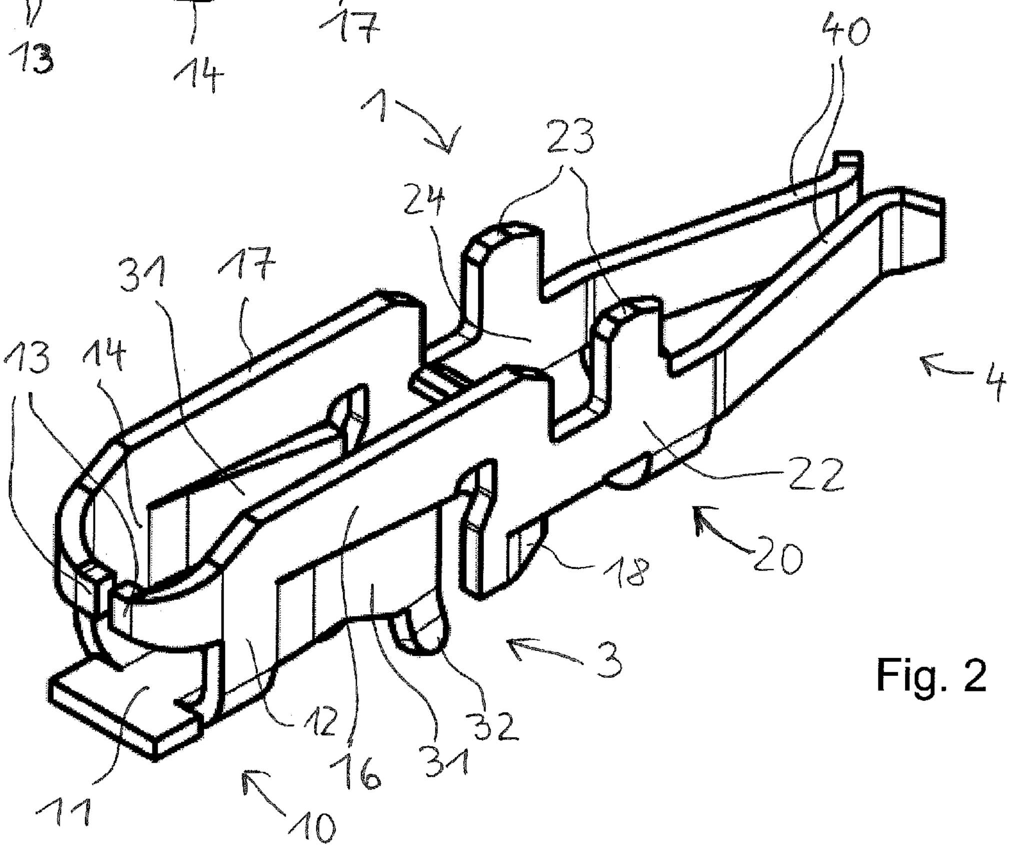
FIG. 2 shows the contact according to FIG. 1 in another perspective view.
Figure 3:
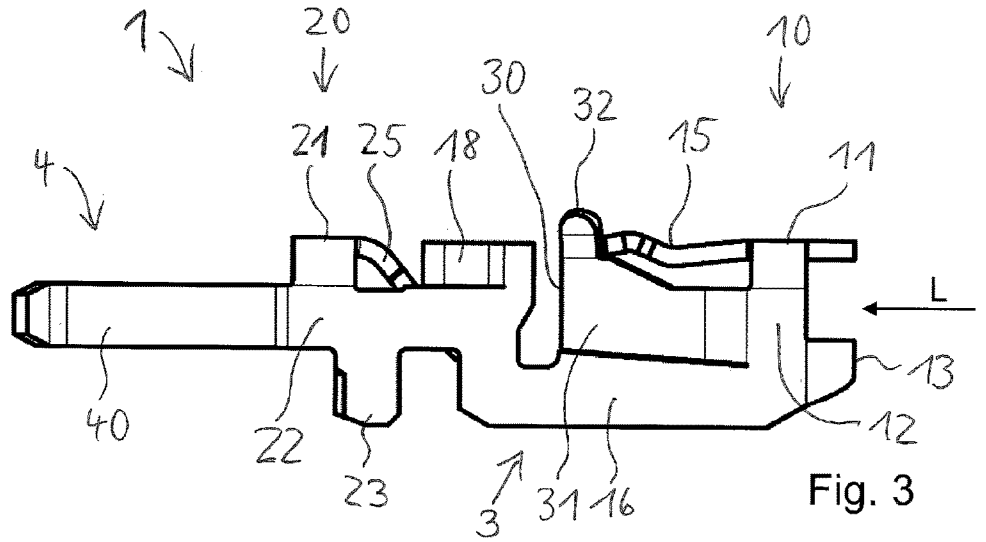
FIG. 3 shows the contact according to FIG. 1 in a side view.

The electrical contact 1 shown in FIGS. 1 to 5 has a terminal section 3 for connecting an electrical conductor and a plug-in section 4 for the plug-in connection of contact 1 to a mating contact. Depending on the design of contact 1, plug-in section 4 can be designed as a male or female plug-in connection, e.g., as a socket contact, pin contact, or blade contact. In the embodiment shown, the plug-in section is designed as a fork contact with two fork tines 40.

In terminal section 3, contact 1 has a spring force clamping connection to which an electrical conductor can be clamped under spring force. In this case, the spring force clamping connection is formed by clamping springs in the form of two spring tongues 31 aligned at an angle to each other. Spring tongues 31 each have a clamping edge at their free end 30.

Contact 1 has a frame-shaped conductor insertion region 10 in terminal section 3, through which an electrical conductor to be clamped is to be inserted into terminal section 3. The frame-shaped conductor insertion region 10 is formed by two mutually opposite first side walls 12, 14, a first cover section 11 connecting the first side walls 12, 14, and a first bottom section 13 opposite to the first cover section 11. The first side walls 12, 14, the first bottom section 13, and the first cover section 11 define a conductor insertion opening. In the embodiment shown, first bottom section 13 is formed by two material sections. Each of these material sections projects from a first side wall 12, 14 and is bent over toward the other first side wall 12, 14.

It can be seen further that contact 1 has a resilient tab 15 which projects from the frame-shaped conductor insertion region 10, in particular from first cover section 11, in the direction of the clamping point. First side walls 12, 14 extend in the lower region of contact 1, which region lies opposite the tab, via connecting sections 16, 17 towards a second frame-shaped region 20. Spring tongues 31 are connected to first side walls 12, 14 and extend from first side walls 12, 14 in the same direction as tab 15 from first cover section 11. The spring tongues are exposed from connecting sections 16, 17 and from first cover section 11 and can thus be freely deformed elastically.

In the second frame-shaped region 20, contact 1 has second side walls 22, 24 connected to each other by a second cover section 21. The second side walls 22, 24 merge into the fork tines 40 in the conductor insertion direction L. Extending from second cover section 21 in the direction of the clamping point is a run-up slope 25 which runs obliquely to conductor insertion direction L. Fixing elements 23 are also arranged on second side walls 22, 24 on the side facing away from second cover section 21, which serve to fix contact 1 in the insulating material housing of the conductor terminal. Fixing elements 23 can be formed as material tongues projecting from the respective second side wall 22, 24.

Between spring tongues 31 and plug-in section 4, in particular in the conductor plug-in direction L still in front of second cover section 21, there are centering bevels 18 which are arranged in the shape of a funnel and are also aligned obliquely to the conductor insertion direction L. Run-up slope 25 can extend so far against the conductor insertion direction L that it overlaps with centering bevels 18.

Spring tongues 31 also each have an actuation tongue 32, which can be arranged adjacent to free end 30 of spring tongue 31 and can project upwards, i.e., from the end edges of spring tongues 31, which edges are directed towards first cover section 11. Actuation tongues 32 form a funnel shape, which forms a receiving funnel for an actuation element for opening the clamping point.

Figure 4:
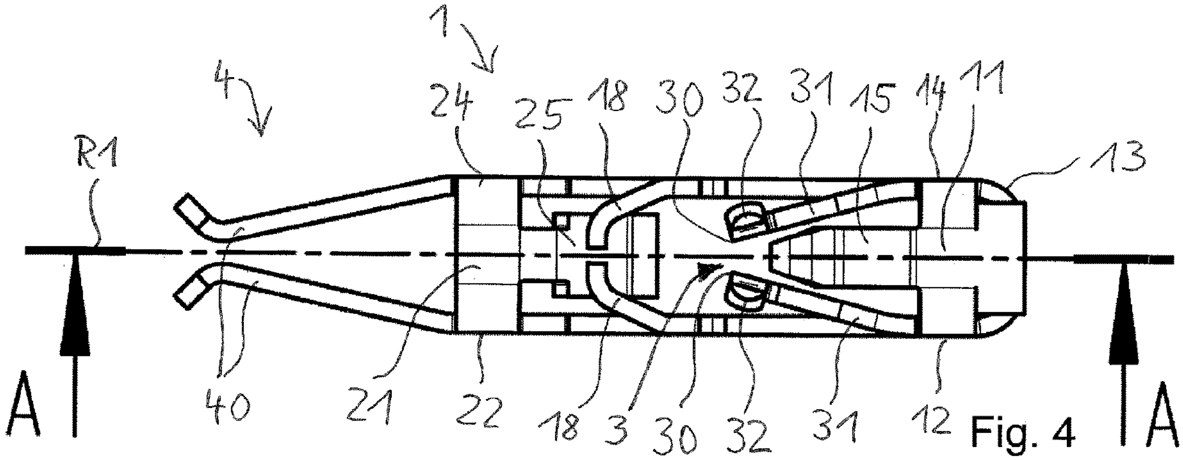
FIG. 4 shows the contact according to FIG. 1 in a plan view.
Figure 5:
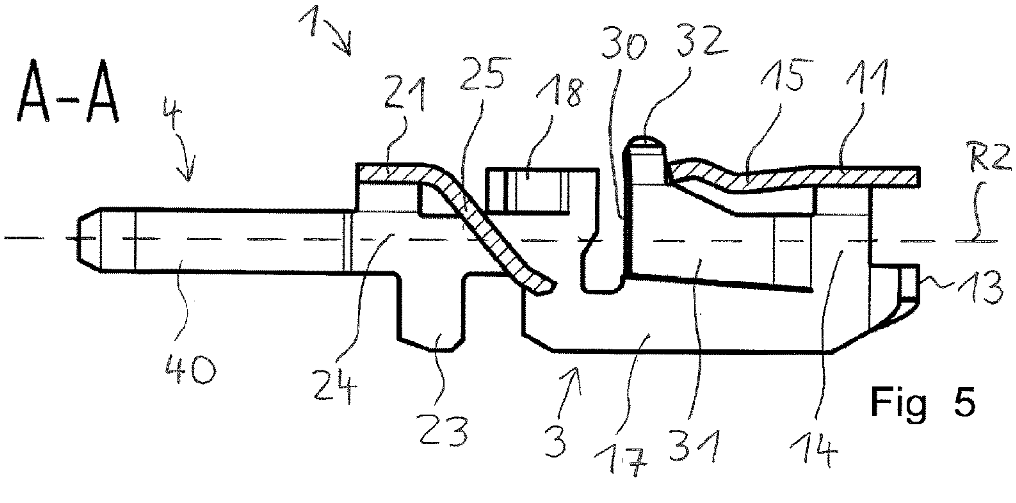
FIG. 5 shows the contact according to FIG. 1 in a side sectional view.

In FIG. 4, section line A-A also marks the first spatial plane R1. The second spatial plane R2 is shown in FIG. 5.

Figure 6:
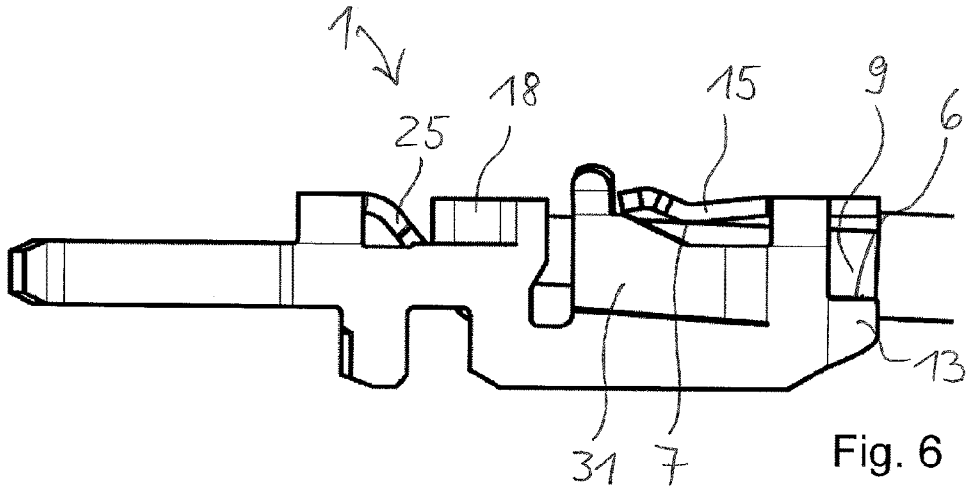
Figure 7:
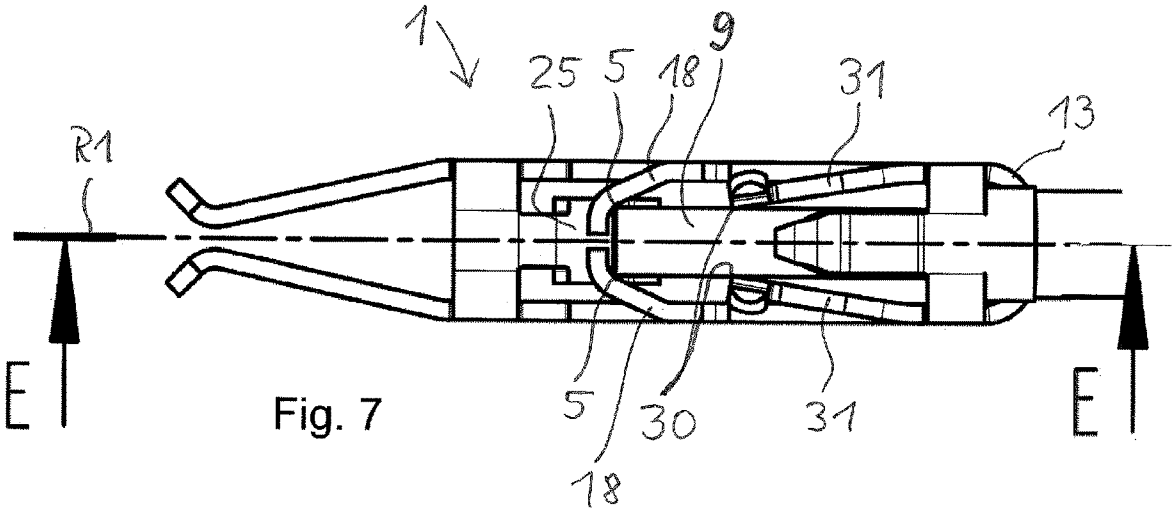
FIG. 7 shows the arrangement according to FIG. 6 in a plan view.
Figure 8:
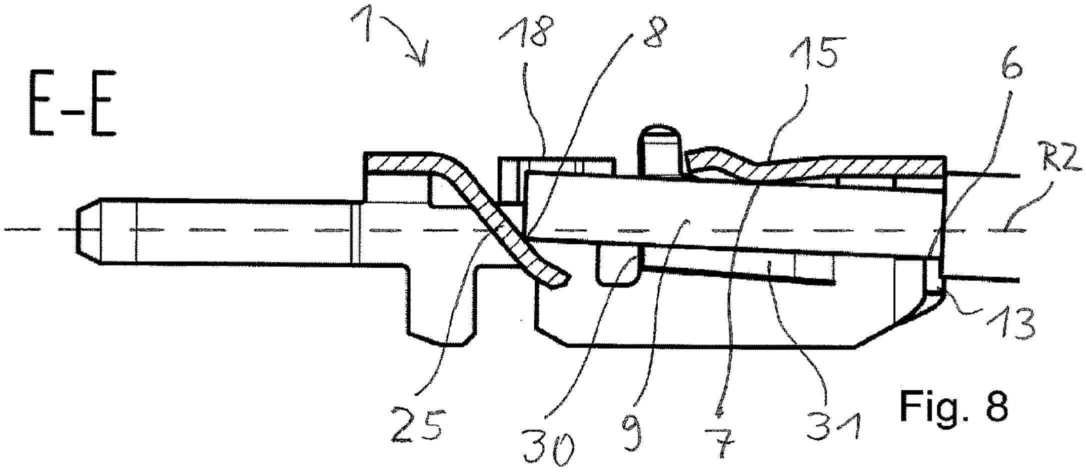
FIG. 8 shows the arrangement according to FIG. 6 in a side sectional view.

FIGS. 6 to 8 show contact 1 with a clamped electrical conductor 9, which has a small cross section. As can be seen, electrical conductor 9 with the small cross section is supported and held in the first spatial plane R1 (indicated by the section line E-E) at three first support points 6, 7, 8. A front first support point 6, viewed in the conductor insertion direction L, is located at first bottom section 13. A middle first support point 7 is located at resilient tab 15. A rear first support point 8 is located on run-up slope 25.

In addition, four second support points 5, 30 are formed. The free ends 30 of spring tongues 31 form two front second support points and centering bevels 18 form two rear second support points 5.

Figure 9:
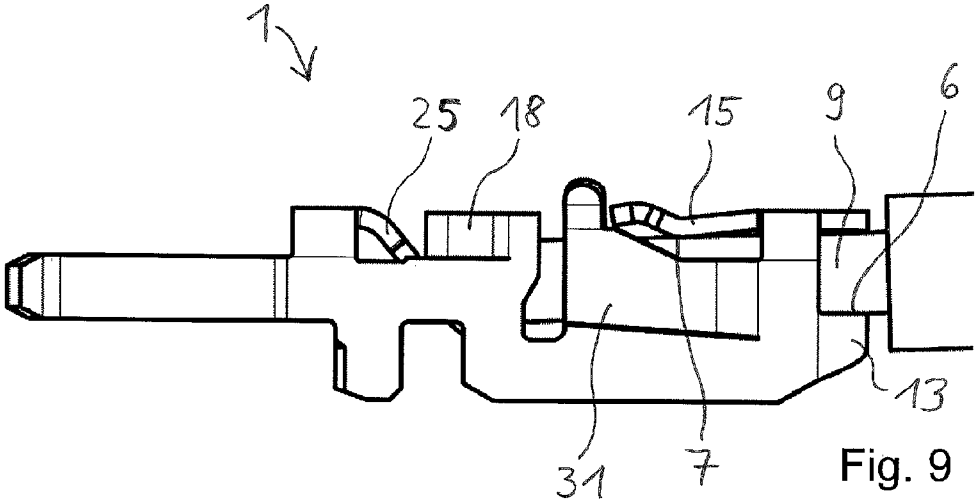
FIG. 9 shows an arrangement as in FIG. 6, but with a larger conductor cross section of the electrical conductor.
Figure 10:
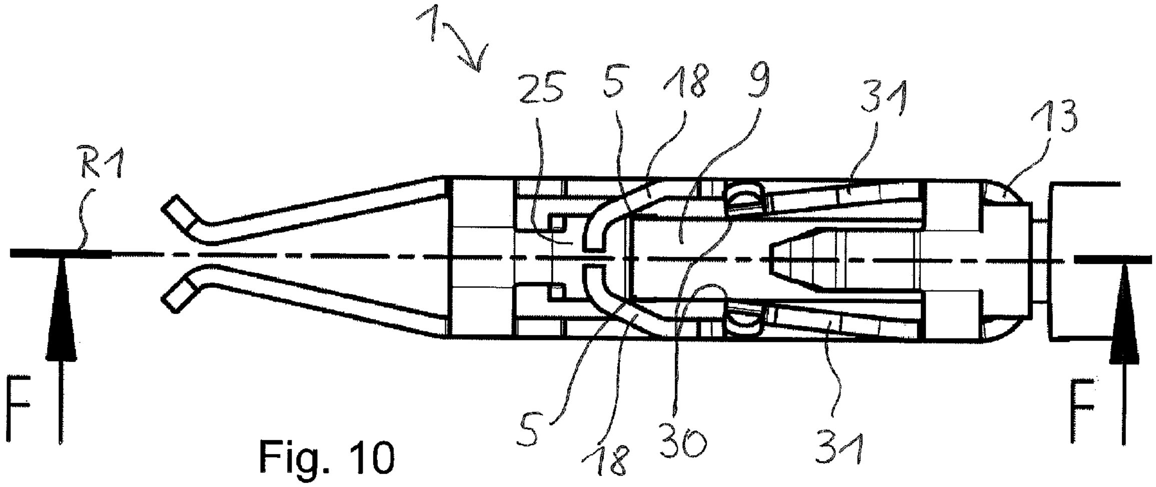
FIG. 10 shows the arrangement according to FIG. 9 in a plan view.
Figure 11:
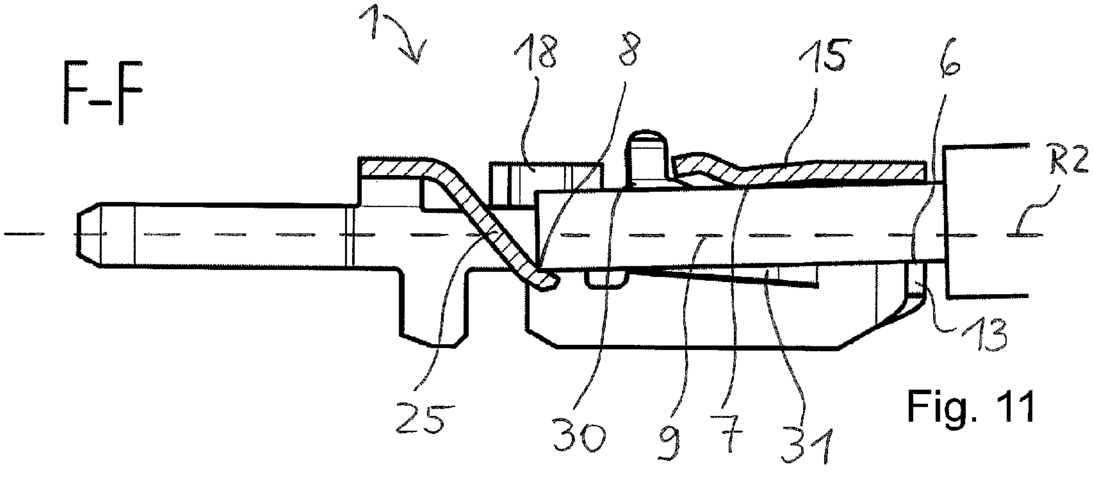
FIG. 11 shows the arrangement according to FIG. 9 in a side sectional view.

FIGS. 9 to 11 show contact 1 with a clamped electrical conductor 9, which has a larger cross section compared to FIGS. 6 to 8. FIGS. 9 to 11 make it clear that the same type of support also occurs for electrical conductor 9 with a larger cross section, namely, in the first spatial plane R1 (marked by the section line F-F) at the three first support points 6, 7, 8, and in the second spatial plane R2 at the four second support points 5, 30.

Figure 12:
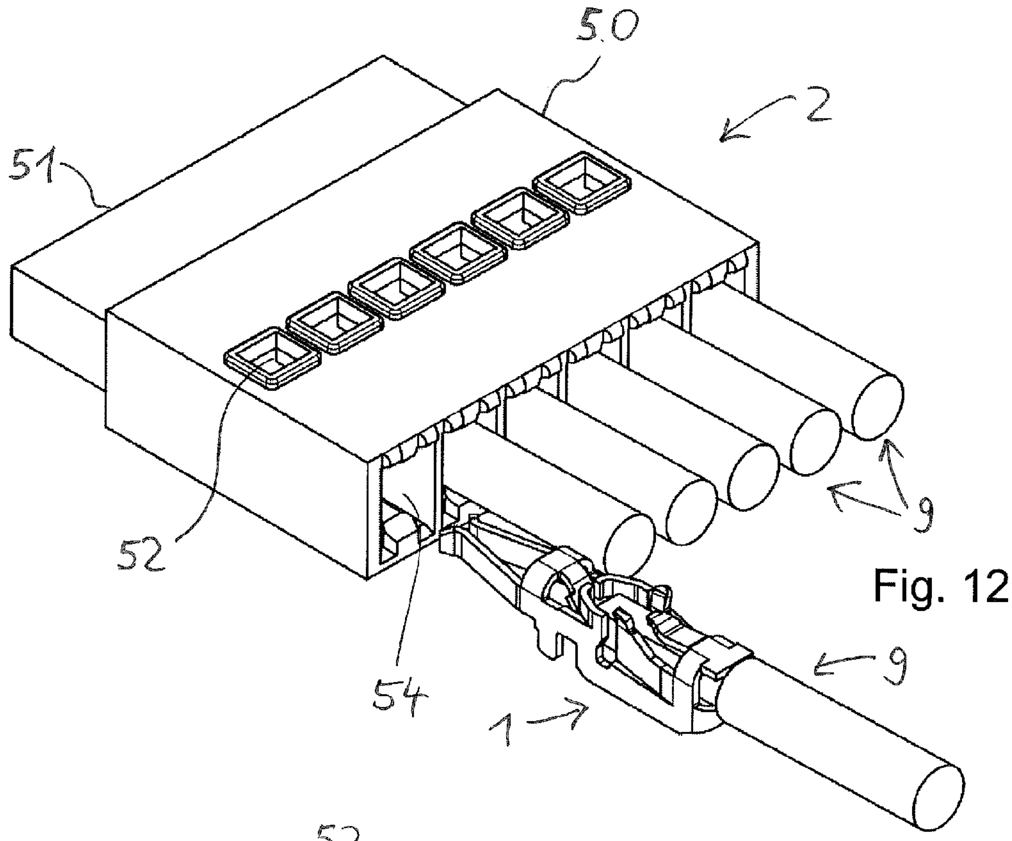
FIG. 12 shows an electrical conductor terminal in perspective view.

FIG. 12 shows a conductor terminal 2 in the form of an electrical plug-in connector with an insulating material housing 50, which has a connector face on a plug-in side 51 where the plug-in connector can be mated with a mating plug-in connector. Multiple contacts 1 provided with electrical conductors 9 arranged thereon are already located in insulating material housing 50. A contact 1 with a conductor 9 attached thereto is shown before insertion into a contact receiving chamber 54 of insulating material housing 50. This contact 1 can be inserted into the contact receiving chamber 54 of insulating material housing 50 by means of the region of electrical conductor 9, which region projects from contact 1.

Figure 13:
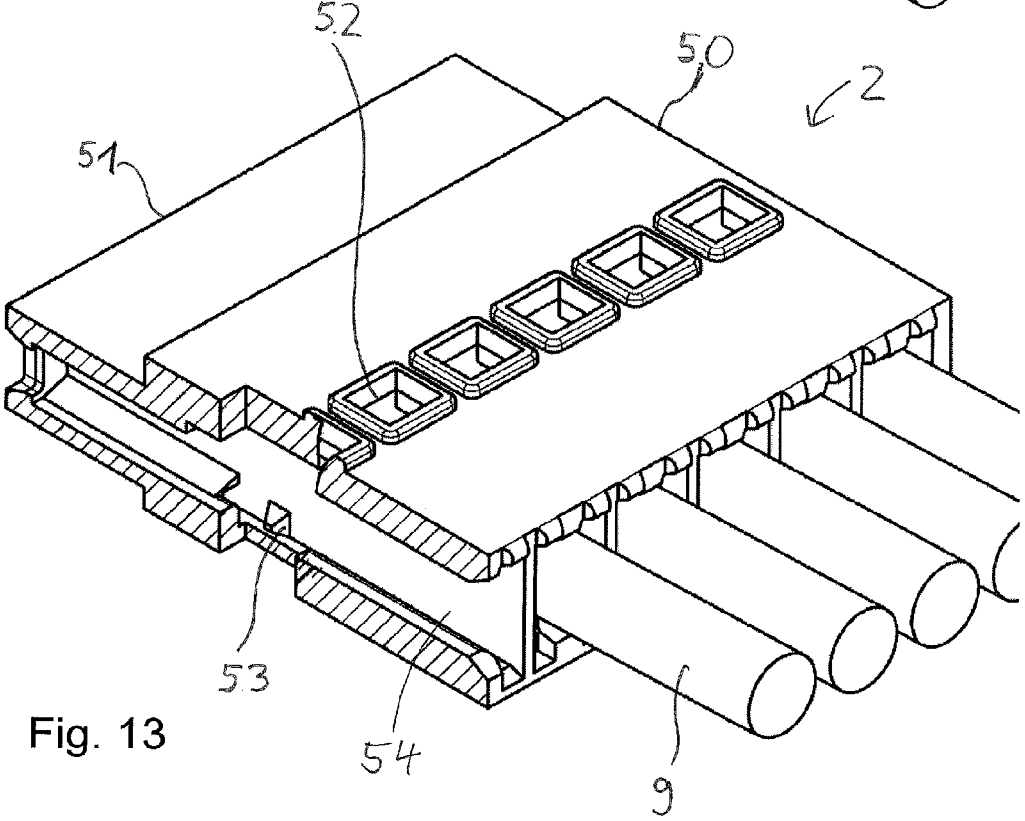
FIG. 13 shows the conductor terminal according to FIG. 12 in a perspective sectional view.

FIG. 13 shows plug-in connector 2 with insulating material housing 50 in a view shown cut in the left region, wherein no contact 1 is inserted there as yet. A retaining element 53 can be seen which is arranged within contact receiving chamber 54 and which interacts with fixing element 23 of the contact to fix contact 1 in contact receiving chamber 54.

Figure 14:
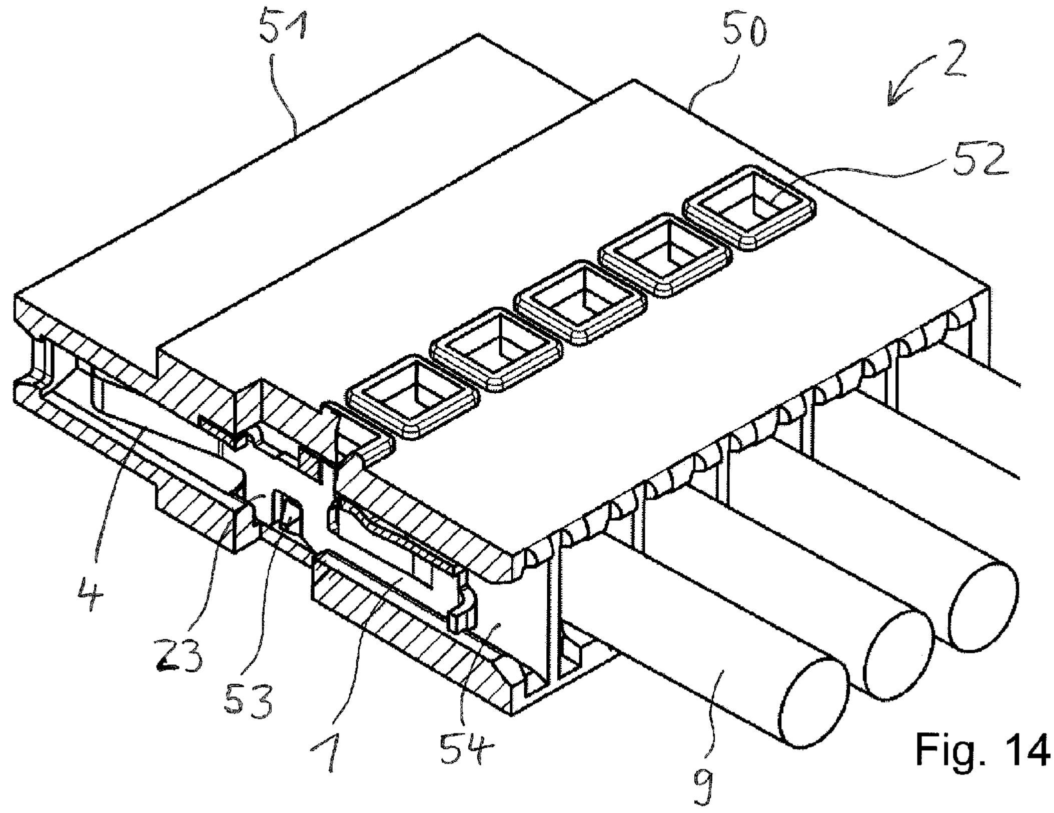
FIG. 14 shows the arrangement according to FIG. 13 with the contact inserted in the sectional plane.

FIG. 14 shows the arrangement according to FIG. 13 with contact 1 inserted into contact receiving chamber 54. The positive fixing of contact 1 can be seen by the overlapping of retaining element 53 by fixing element 23.

An advantageous option for actuating the spring force clamping connection of contacts 1 in insulating material housing 50 is illustrated with reference to FIG. 15. Insulating material housing 50 has respective actuation openings 52 at those points where the actuation tongues 32 are located in inserted contacts 1. Actuation tongues 32 can be actuated by means of basically any tool through actuation opening 52 and thus be spread apart.

Figure 15:
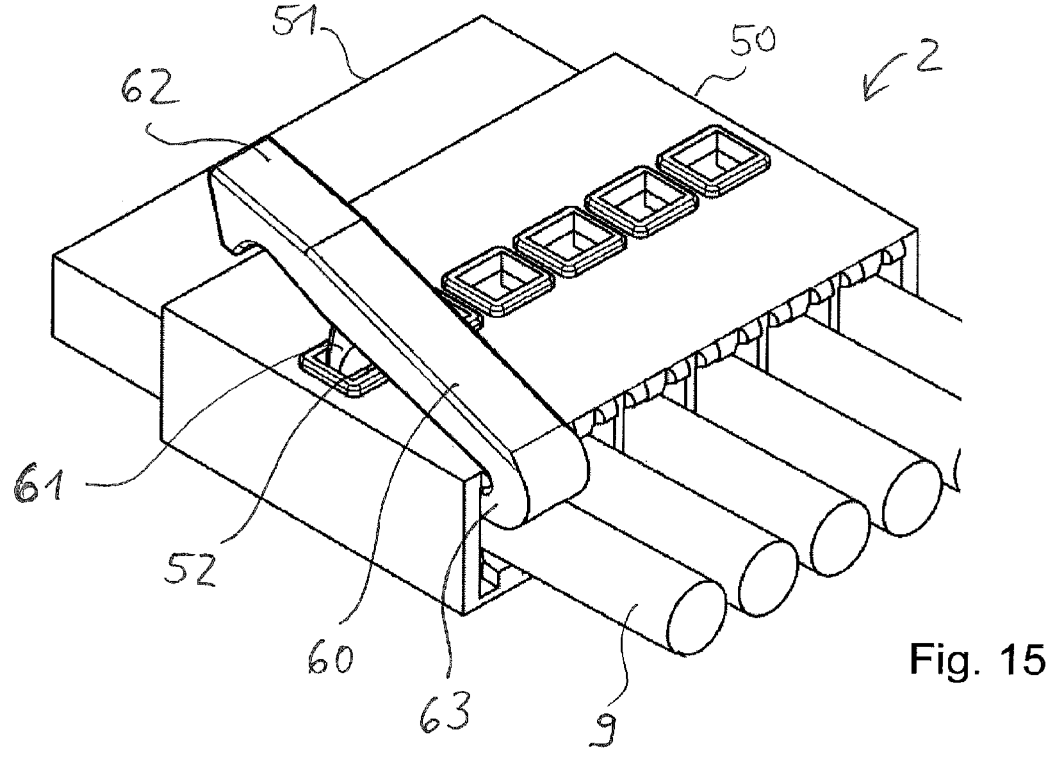
FIG. 15 shows a conductor terminal with an actuation tool arranged thereon.

FIG. 15 shows an advantageous embodiment in which an actuation tool 60 specially adapted to insulating material housing 50 is used. Actuation tool 60 has a lever-like design. It has a manual actuation region 62 and an actuation plunger 61 that can be passed through actuation opening 52. Actuation element 60 can be hooked onto insulating material housing 50 and thus fixed via a fixing region 63, which is arranged at the end of actuation element 60, said end facing away from manual actuation region 62. Now, by pressing the manual actuation area 62, the spring force clamping connection can be actuated in a simple and convenient way; i.e., the clamping point can be opened.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electrical contact for a conductor terminal that has an insulating material housing, the electrical contact comprising:

a terminal section for connection to an electrical conductor, wherein the terminal section has a spring force clamping connection with at least one clamping spring for connection of the electrical conductor under spring force;

at least three first support points for supporting and holding the electrical conductor clamped to the spring force clamping connection in a first spatial plane; and at least three or at least four second support points for supporting and holding the electrical conductor clamped to the spring force clamping connection in a second spatial plane, which is orthogonal to the first spatial plane wherein, in a conductor insertion direction of the electrical conductor in the spring force clamping connection, the at least three first support points comprise a front first support point, a middle first support point, and a rear first support point, wherein the middle first support point is arranged behind the front first support point and in front of the rear first support point in the conductor insertion direction and is located on a side of the electrical conductor, which side faces away from the front first support point and rear first support point, wherein the terminal section has a frame-shaped conductor insertion region through which the electrical conductor is to be inserted into the terminal section, and wherein the electrical contact has a resilient tab which projects from the frame-shaped conductor insertion region in the direction of the clamping point, the resilient tab forming the middle first support point.

2. The electrical contact according to claim 1, wherein the spring force clamping connection has a defined clamping point for clamping the electrical conductor, wherein the front first support point is in front of the clamping point in the conductor insertion direction and the rear first support point is behind the clamping point.

3. The electrical contact according to claim 1, wherein the middle first support point has a distance from the front first support point that deviates by a maximum of 50% from a distance of the middle first support point from the rear first support point.

4. The electrical contact according to claim 1, wherein the electrical contact has a run-up slope for the electrical conductor which runs obliquely to the conductor insertion direction, wherein the rear first support point is located at the run-up slope.

5. The electrical contact according to claim 1, wherein the front first support point is located at the frame-shaped conductor insertion region.

6. The electrical contact according to claim 5, wherein the frame-shaped conductor insertion region has two mutually opposite first side walls, a first cover section connecting the first side walls, and a first bottom section opposite to the first cover section, wherein the first side walls, the first bottom section, and the first cover section define a conductor insertion opening.

7. The electrical contact according to claim 6, wherein one or both of the first side walls each have at least one spring tongue which is exposed from the first bottom section and the first cover section and forms a clamping point for clamping an electrical conductor under spring force, the at least one spring tonque being part of the at least one clamping spring of the spring force clamping connection.

8. The electrical contact according to claim 6, wherein the first bottom section is formed by two material sections, wherein each of the two material sections is bent from one first side wall in the direction of the other first side wall, wherein a parting line is formed between the two material sections.

9. The electrical contact according to claim 1, wherein the at least one clamping spring of the spring force clamping connection includes two spring tongues which taper obliquely towards each other, wherein a clamping point is formed between free ends of the two spring tongues.

10. The electrical contact according to claim 9, wherein the at least four second support points are provided and comprise two front second support points and two rear second support points in the conductor insertion direction, wherein the front second support points are arranged in front of the rear second support points in the conductor insertion direction.

11. The electrical contact according to claim 10, wherein the free ends of the two spring tongues form the front second support points.

12. The electrical contact according to claim 10, wherein the electrical contact has centering bevels which are aligned obliquely with respect to the conductor insertion direction and are arranged in a funnel shape and at which the rear second support points are located.

13. The electrical contact according to claim 1, wherein the electrical conductor can be clamped to the spring force clamping connection before the electrical contact is arranged in the insulating material housing, wherein the electrical contact can be inserted into the insulating material housing by the clamped-on electrical conductor and can be fixed in the insulating material housing by fixing element of the electrical contact.

14. The electrical contact according to claim 1, wherein the electrical contact is formed as a plug-in contact having a plug-in section for pluggable connection to a mating plug-in contact.

15. A conductor terminal with an insulating material housing and one or more electrical contacts according to claim 1, to each of which an electrical conductor is clamped.

16. The conductor terminal according to claim 15, wherein the insulating material housing has, in the case of one, a plurality, or all of the electrical contacts, an actuation opening which is arranged in a region of actuation tongues of the electrical contacts and through which the spring force clamping connection can be opened by an actuation tool.

17. A method for providing a conductor terminal according to claim 15 with at least one electrical conductor connected to an electrical contact of the conductor terminal, having the following steps:

providing the insulating material housing of the conductor terminal, wherein the insulating material housing has one or more contact receiving chambers, each of which is set up to receive an electrical contact, but is not yet equipped with the electrical contact;

connecting an electrical conductor to an electrical contact while the electrical contact is completely outside the contact receiving chamber or loosely inserted therein in a preassembly position; and inserting the electrical contact connected to the electrical conductor through a receiving opening into the still free contact receiving chamber of the insulating material housing until the electrical contact has reached an end position within the contact receiving chamber and is fixed there.

18. The electrical contact according to claim 4, wherein the resilient tab terminates at a free end, the free end being located in front of and axially spaced apart from the run-up slope in the conductor insertion direction of the electrical conductor.

19. The electrical contact according to claim 18, wherein, in the conductor insertion direction of the electrical conductor, two of the second support points are located behind the free end of the resilient tab and in front of the run-up slope.

* * * * *